United States Patent
Jang

(10) Patent No.: US 12,131,254 B2
(45) Date of Patent: Oct. 29, 2024

(54) METHOD AND APPARATUS WITH NEURAL NETWORK DISTRIBUTED PROCESSING

(71) Applicant: Samsung Electronics Co., Ltd., Suwon-si (KR)

(72) Inventor: Jiseung Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1018 days.

(21) Appl. No.: 16/919,661

(22) Filed: Jul. 2, 2020

(65) Prior Publication Data

US 2021/0216863 A1    Jul. 15, 2021

(30) Foreign Application Priority Data

Jan. 15, 2020  (KR) .................. 10-2020-0005273

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC  G06N 3/08; G06N 3/04; G06N 3/044; G06N 3/045; G06N 3/047; G06N 3/063; G06N 3/105; G06N 3/082
See application file for complete search history.

(56) References Cited

U.S. PATENT DOCUMENTS

| | | |
|---|---|---|
| 5,892,681 A | 4/1999 | McDermith et al. |
| 8,503,783 B2 | 8/2013 | Rother et al. |
| 8,700,689 B2 | 4/2014 | Macready et al. |
| 9,811,775 B2 | 11/2017 | Krizhevsky et al. |
| 2019/0303762 A1* | 10/2019 | Sui .................. G06N 3/04 |

FOREIGN PATENT DOCUMENTS

| | | |
|---|---|---|
| KR | 10-2006-0093581 A | 8/2006 |
| KR | 10-2015-0089853 A | 8/2015 |
| KR | 10-2016-0063965 A | 6/2016 |
| KR | 10-2017-0117861 A | 10/2017 |
| KR | 10-2018-0048109 A | 5/2018 |
| KR | 10-2019-0052893 A | 5/2019 |
| KR | 10-2019-0055608 A | 5/2019 |

(Continued)

OTHER PUBLICATIONS

Jia, Zhihao, Matei Zaharia, and Alex Aiken. "Beyond Data and Model Parallelism for Deep Neural Networks." Proceedings of Machine Learning and Systems 1 (2019): 1-13 (Year: 2019).*

(Continued)

*Primary Examiner* — Brian M Smith
(74) *Attorney, Agent, or Firm* — NSIP Law

(57) ABSTRACT

A processor-implemented neural network distributed processing method includes: obtaining a first operation cost of a neural network according to a distribution strategy based on a plurality of operation devices; generating an operation configuration corresponding to the neural network based on the obtained first operation cost; performing a reduction operation on the generated operation configuration; and processing an operation of the neural network based on a reduced operation configuration obtained by performing the reduction operation.

25 Claims, 11 Drawing Sheets

(56) References Cited

FOREIGN PATENT DOCUMENTS

KR  10-2019-0091858 A  8/2019

OTHER PUBLICATIONS

Irwin-Harris, William, et al. "A graph-based encoding for evolutionary convolutional neural network architecture design." 2019 IEEE Congress on Evolutionary Computation (CEC). IEEE, 2019. (Year: 2019).*

Dean, J. et al., "Large scale distributed deep networks," Advances in Neural Information Processing Systems vol. 25 (2012) 9 pp. (Year: 2012).*

Jia, Zhihao et al., "Beyond Data and Model Parallelism for Deep Neural Networks", arXiv preprint arXiv:1807.05358, 2018 (15 pages in English).

Anderson, Andrew et al., "Optimal DNN primitive Selection with Partitioned Boolean Quadratic Programming," *Proceedings of the 2018 International Symposium on Code Generation and Optimization*, 2018 (9 pages in English).

\* cited by examiner

[Channel]  [Height]  [Width]

METHOD AND APPARATUS WITH NEURAL NETWORK DISTRIBUTED PROCESSING

CROSS-REFERENCE TO RELATED APPLICATIONS

This application claims the benefit under 35 USC § 119(a) of Korean Patent Application No. 10-2020-0005273 filed on Jan. 15, 2020, in the Korean Intellectual Property Office, the entire disclosure of which is incorporated herein by reference for all purposes.

BACKGROUND

1. Field

The following description relates to a method and apparatus with neural network distributed processing.

2. Description of Related Art

A typical distributed processing method of a neural network model may focus on how to improve the speed of distributed processing of a single layer of the neural network.

However, a distribution strategy used for one layer may not be a distribution strategy used for another layer, or all layers, of the neural network. This is because a distribution strategy for a previous layer may affect a distribution strategy for a subsequent layer.

For example, when dividing data to be processed in a single convolution layer by a channel direction of the data and processing the divided data is an optimal strategy, there may be a data layout change cost for combining the data divided by such channel direction and dividing the data again by a height direction of the data and there may be a network cost for dividing data of a subsequent convolution layer by the height direction.

However, when the subsequent convolution layer is divided by a channel direction of the data, a cost for combining the data gain may not be incurred. As described above, a distribution strategy for a previous layer may not work independently of a distribution strategy for a subsequent layer.

A device needed to accelerate a deep neural network (DNN) may be produced with its focus being on a certain function, and thus the function may not be generalized. Thus, a function of rapidly operating a portion of the neural network may be implemented in a field-programmable gate array (FPGA) and be used separately, or a function of strengthening communication among devices, such as, for example, NVLink, may be used.

The typical distributed processing method of the neural network may not be a single distribution strategy that is optimal or efficient when implemented by a plurality of devices. Further, even when a single network is implemented by the plurality of devices, the implementable resources may not be optimally or efficiently configured.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network distributed processing method includes: obtaining a first operation cost of a neural network according to a distribution strategy based on a plurality of operation devices; generating an operation configuration corresponding to the neural network based on the obtained first operation cost; performing a reduction operation on the generated operation configuration; and processing an operation of the neural network based on a reduced operation configuration obtained by performing the reduction operation.

The obtaining of the first operation cost may include: obtaining an operation time included in the first operation cost for a layer of the neural network based on the distribution strategy; and
obtaining a switching time included in the first operation cost according to the distribution strategy.

The operation time may include a time for processing the operation of the neural network in the layer, and the switching time may include a time for transmitting output data of the operation of the neural network in the layer to a subsequent layer of the neural network.

The generating of the operation configuration may include: generating a node of the neural network based on the operation time; and generating an edge connecting the node to one or more nodes of the neural network based on the switching time.

The generating of the node may include: generating the node based on a vector including the operation time as a component.

The operation time included in the vector may include a plurality of operation times, and each of the operation times may be for performing the operation of the neural network in the layer based on a respective parallel processing method.

The generating of the edge may include: generating the edge by generating an adjacency matrix including the switching time as a component.

The performing of the reduction operation may include: merging a plurality of nodes of the neural network based on a plurality of vectors corresponding to the nodes included in the operation configuration and an adjacency matrix corresponding to an edge connecting two or more of the nodes.

The merging may include: calculating, based on the vectors and the adjacency matrix, a second operation cost including an operation time of a first node of the nodes, an operation time of a second node of the nodes, and a switching time between the first node and the second node; and merging the first node and the second node based on the second operation cost.

The calculating of the second operation cost may include: calculating, based on the distribution strategy, a sum of a component of a vector corresponding to the operation time of the first node, a component of a vector corresponding to the operation time of the second node, and a component of the adjacency matrix corresponding to the switching time.

The merging of the first node and the second node based on the second operation cost may include: merging the first node and the second node such that the second operation cost is minimized.

The distribution strategy may be determined based on the number of the operation devices and a division method of dividing an input to the neural network.

The operation configuration may include a directed acyclic graph (DAG) of nodes and edges of the neural network.

A non-transitory computer-readable storage medium may store instructions that, when executed by a processor, configure the processor to perform the method.

In another general aspect, a neural network distributed processing apparatus includes: a processor configured to obtain a first operation cost of a neural network according to a distribution strategy based on a plurality of operation devices, generate an operation configuration corresponding to the neural network based on the obtained first operation cost, perform a reduction operation on the generated operation configuration, and process an operation of the neural network based on an operation configuration obtained by performing the reduction operation.

For the obtaining of the first operation cost, the processor may be configured to: obtain an operation time included in the first operation cost for a layer of the neural network based on the distribution strategy; and obtain a switching time included in the first operation cost according to the distribution strategy.

For the generating of the operation configuration, the processor may be configured to: generate a node of the neural network based on the operation time; and generate an edge connecting the node to one or more nodes of the neural network based on the switching time.

For the generating of the node, the processor may be configured to: generate the node based on a vector including the operation time as a component.

For the generating of the edge, the processor may be configured to: generate the edge by generating an adjacency matrix including the switching time as a component.

For the performing of the reduction operation, the processor may be configured to: merge a plurality of nodes of the neural network based on a plurality of vectors corresponding to the nodes included in the operation configuration and an adjacency matrix corresponding to an edge connecting two or more of the nodes.

For the merging, the processor may be configured to: calculate, based on the vectors and the adjacency matrix, a second operation cost including an operation time of a first node of the nodes, an operation time of a second node of the nodes, and a switching time between the first node and the second node; and merge the first node and the second node based on the second operation cost.

For the calculating of the second operation cost, the processor may be configured to: calculate, based on the distribution strategy, a sum of a component of a vector corresponding to the operation time of the first node, a component of a vector corresponding to the operation time of the second node, and a component of the adjacency matrix corresponding to the switching time.

For the merging of the first node and the second node, the processor may be configured to: merge the first node and the second node such that the second operation cost is minimized.

The distribution strategy may be determined based on the number of the operation devices and a division method of dividing an input to the neural network.

The apparatus may include a memory storing instructions that, when executed by the processor, configured the processor to perform the obtaining of the first operation cost, the generating of the operation configuration, the performing of the reduction operation, and the processing of the operation included in the neural network.

Other features and aspects will be apparent from the following detailed description, the drawings, and the claims.

Figure 1:
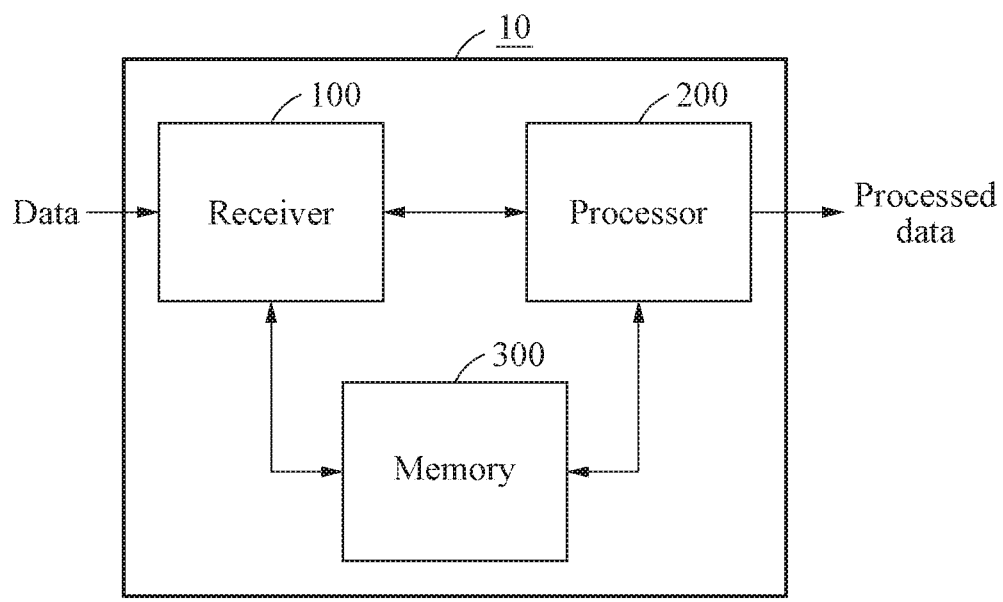
FIG. 1 illustrates an example of a distributed processing apparatus of a neural network model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

As used herein, the singular forms are intended to include the plural forms as well, unless the context clearly indicates otherwise. The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a distributed processing apparatus of a neural network model.

Referring to FIG. 1, a distributed processing apparatus 10 of a neural network model may process data. The distributed processing apparatus 10 may perform inference using a neural network.

The data may include an image, a character, a numeral, and/or sound. In addition, input data may include the neural network model.

The distributed processing apparatus 10 may perform an operation of the neural network using a plurality of operation devices. The distributed processing apparatus 10 may improve a speed of the inference by distributing the operation of the neural network to the operation devices.

The neural network may include a statistical learning algorithm that emulates biological nerves in machine learning and cognitive science. The neural network may include a model having a problem-solving ability implemented through artificial neurons or nodes forming a network of synaptic connections where an intensity or strength of the synaptic connections have been optimized through learning. While the nodes may be referred to as "artificial neurons" or "neurons," and the connections therebetween may be referred to "synaptic connections," such reference is not intended to impart any relatedness with respect to how the neural network architecture computationally maps or thereby intuitively recognizes information and how a human's neurons operate. I.e., the terms "artificial neurons" or "neurons" are merely terms of art referring to the hardware implemented nodes of a neural network.

The neural network may include a deep neural network (DNN). The neural network may include a convolutional neural network (CNN), a recurrent neural network (RNN), a perceptron, a feedforward (FF) network, a radial basis function (RBF) network, a deep FF (DFF) network, a long short-term memory (LSTM), a gated recurrent unit (GRU), an autoencoder (AE), a variational AE (VAE), a denoising AE (DAE), a sparse AE (SAE), a Markov chain (MC), a Hopfield network (HN), a Boltzmann machine (BM), a restricted BM (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN).

The distributed processing apparatus 10 may improve the speed of the inference by distributing the operation of the neural network and controlling the operation devices to perform the operation in parallel.

The operation devices may include a plurality of processors or cores.

The distributed processing apparatus 10 may be used for a system using an accelerator of a manycore structure, and applied to a framework for distributed processing and/or parallel processing of a deep learning network.

The distributed processing apparatus 10 may be used for inference in a system configured to infer data in real time, or at a large cloud and a data center.

The distributed processing apparatus 10 may perform data parallelism through distributed processing performed on data by the operation devices, and model parallelism through distributed processing performed on the neural network model by the operation devices.

The model parallelism may refer to a method of dividing the neural network model to accelerate inference or learning.

The distributed processing apparatus 10 may divide or partition the neural network model to assign the divided or partitioned model to different operation devices or nodes, and control them to process respective operations in response to a given input through the divided or partitioned model.

The model parallelism may more efficiently uses resources by occupying less memory when implementing the operation devices compared to when implementing the single device.

However, there may be a technical problem with a typical model parallelism in that the typical model parallelism may have a high latency due to a communication overhead and may inefficiently use resources of a device.

The distributed processing apparatus 10 may divide the model through the following two methods. For example, the distributed processing apparatus 10 may perform inter-layer parallelism that divides layers included in the model.

For another example, the distributed processing apparatus 10 may perform intra-layer parallelism that divides layers themselves and processes them.

The inter-layer parallelism may be used along with pipelining when an operation device is in an idle state waiting for a result value of another operation device.

The intra-layer parallelism may include dividing a layer of a neural network based on a channel, a height, and/or a width of an input image (or an input feature map of the input image). The distributed processing apparatus 10 may divide the layer in various directions simultaneously, for example, in at least two of the channel, the height, and/or the width direction.

The distributed processing apparatus 10 may divide a weight (e.g., a weight of a node of the layer) along with a portion to be calculated with the input image. The divided input and weight may be calculated by each of the operation devices and merged into a single output feature map.

The layers of the neural network model may have respective features, and each of the layers may thus have a performance that varies based on a direction in which the layer is to be divided. For example, one of the layers may have a highest level of performance when it is divided based on a channel, and another layer of the layers may have a highest level of performance when it is divided based on a height.

The distributed processing apparatus 10 may include a processor 200, a memory 300 (e.g., one or more memories), and a receiver 100, as illustrated in FIG. 1.

The receiver 100 may receive data. The receiver 100 may receive the data from, or transfer the data to, the processor 200 and/or the memory 300. In a non-limiting example, the receiver 100 may be or include one or more sensors, such as one or more image sensors configured to receive or capture the data as image data.

The processor 200 may process data stored in the memory 300. The processor 200 may execute computer-readable instructions stored in the memory 300, and, when executed by the processor 200, the instructions may configure the processor to perform operations.

The processor 200 may be a data processing device embodied by hardware having a circuit of a physical structure to execute instructed operations. The instructed operations may include instructions included in a program, for example.

The data processing device embodied by hardware may include, for example, a microprocessor, a central processing unit (CPU), a processor core, a multicore processor, a multiprocessor, an application-specific integrated circuit (ASIC), and/or a field-programmable gate array (FPGA).

The processor 200 may obtain a first operation cost of the neural network according to a distribution strategy based on the operation devices. The first operation cost may include an operation time and a switching time.

The processor 200 may obtain the operation time included in the first operation cost for a layer of the neural network according to the distribution strategy. The operation time may differ based on the distribution strategy.

The distribution strategy may include a strategy on how to distribute an operation of the neural network to the operation devices. The distribution strategy may be determined based on the number of the operation devices and a division method of dividing an input to the neural network.

The division method may include at least one of channel-based division, height-based division, and/or width-based division.

A non-limiting example of the distribution strategy may be as described in further detail below with reference to FIGS. 2A and 2B.

The processor 200 may obtain the switching time included in the first operation cost according to the distribution strategy. The switching time may include an amount of time used for one operation device to transmit data to another operation device, or an amount of time used to transmit data for an operation corresponding to another layer from an operation corresponding to one layer.

The processor 200 may generate a graph (e.g., an operation configuration) corresponding to the neural network based on the first operation cost. The graph may include data schematically illustrating an operation of the neural network performed by the operation devices by nodes of layers and edges between nodes of different layers of the neural network. The graph may include, for example, a directed acyclic graph (DAG) or a weighted DAG.

The processor 200 may generate a node based on the operation time. The processor 200 may generate the node including a vector having the operation time as a component.

The processor 200 may generate an edge connecting nodes based on the switching time. The processor 200 may generate the edge by generating an adjacency matrix having the switching time as a component.

For example, a node may be indicated by an operation cost corresponding to a layer from an input to an output of the neural network and/or an operation device that performs an operation of the layer. In addition, an edge may connect one node to another node and be indicated by an adjacency matrix corresponding to a switching time between the nodes.

The graph may be generated as described in further detail below with reference to FIGS. 2A and 2B, as a non-limiting example.

The processor 200 may perform a reduction operation on the generated graph. Herein, reduction may include merging a plurality of nodes.

The processor 200 may merge the nodes based on vectors corresponding to the nodes included in the graph and an adjacency matrix corresponding to an edge connecting the nodes.

The processor 200 may calculate a second operation cost needed for an operation from a first node to a second node included in the nodes based on the vectors and the adjacency matrix.

The second operation cost may refer to an operation cost for the reduction operation. The second operation cost may refer to a cost for merging the nodes based on an operation time and a switching time needed to perform the operation from the first node to the second node.

The processor 200 may calculate the second operation cost by calculating a sum of a component of a vector corresponding to the first node, a component of a vector corresponding to the second node, and a component of the adjacency matrix, based on the distribution strategy.

The processor 200 may merge the first node and the second node based on the second operation cost. The processor 200 may merge the first node and the second node such that the second operation cost is minimized.

The processor 200 may process an operation through the neural network based on a graph obtained by performing the reduction operation. That is, the processor 200 may perform an operation of the neural network using the obtained graph as the distribution strategy.

The memory 300 may store instructions or a program executable or to be executed by the processor 200. For example, the instructions may include instructions for executing an operation of the processor 200 and/or an operation of each component of the processor 200.

The memory 300 may be embodied by a volatile and/or nonvolatile memory device.

The volatile memory device may be embodied by, for example, a dynamic random-access memory (DRAM), a static RAM (SRAM), a thyristor RAM (T-RAM), a zero-capacitor RAM (Z-RAM), and/or a twin-transistor RAM (TTRAM).

The nonvolatile memory device may be embodied by, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, and/or an insulator resistance change memory.

The processor 200 may generate a graph and perform a reduction operation as described in further detail below with reference to FIGS. 2A through 5D, as a non-limiting example.

Figure 2A:
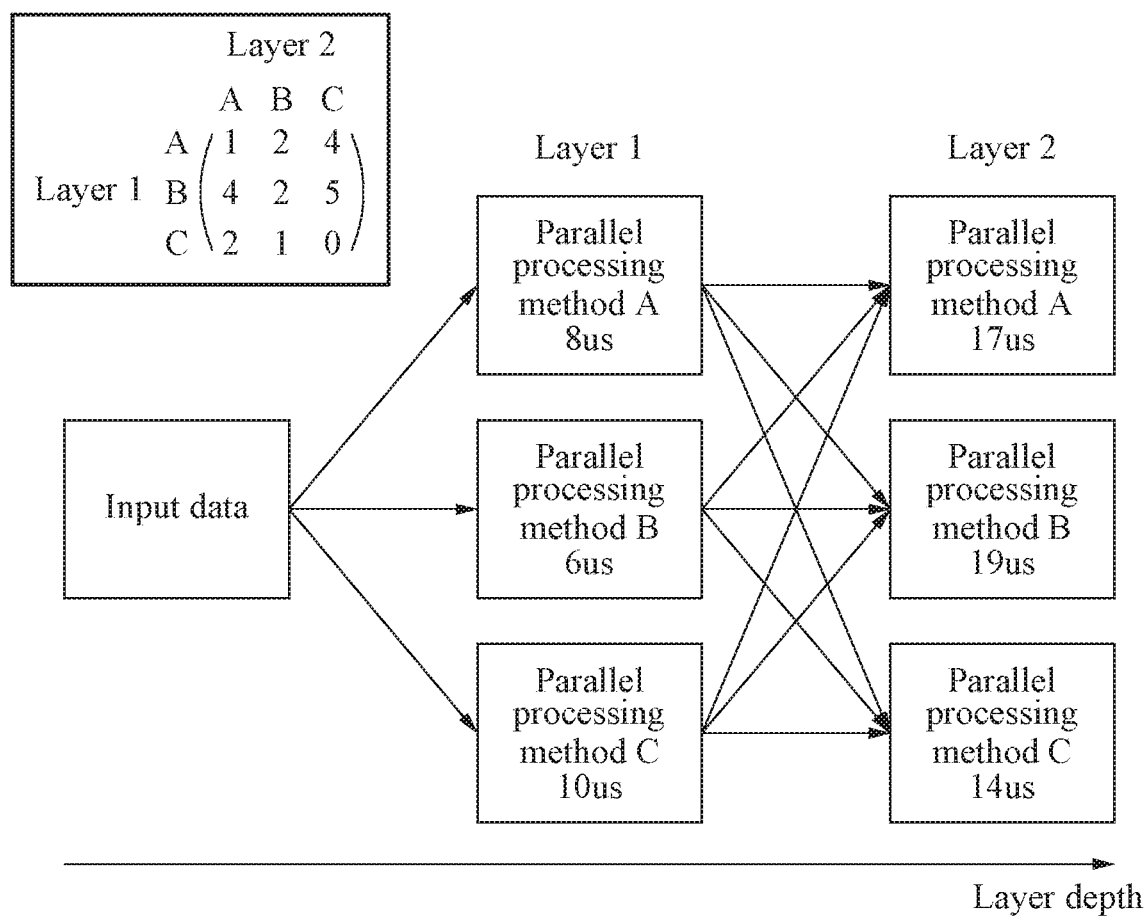
FIG. 2A illustrates an example of distributed processing performed by a distributed processing apparatus of a neural network model.

FIG. 2A illustrates an example of distributed processing performed by a distributed processing apparatus of a neural network model (e.g., the distributed processing apparatus 10 of the neural network model illustrated in FIG. 1). FIG. 2B illustrates an example of dividing an input by a distributed processing apparatus of a neural network model (e.g., the distributed processing apparatus 10). FIG. 3 illustrates an example of a portion of a graph generated by a distributed processing apparatus of a neural network model (e.g., the distributed processing apparatus 10).

Referring to FIGS. 2A through 3, in an environment where various device resources are prepared, the processor 200 may calculate a cost for executing an entire network based on a distribution strategy for all layers instead of finding a distribution strategy to be applied to rapidly process one neural network layer, and may determine a distribution strategy combination requiring the least cost. For example the processor 200 may determine a distribution strategy for each of a plurality of layers by determining a combination of distribution strategies of the plurality of layers of the network having the least total or combined cost among possible combinations.

The processor 200 may determine a combination of a plurality of layers of a neural network and a plurality of operation devices that perform respective operations of the layers, and generate a distribution strategy that minimizes an operation cost.

The processor 200 may generate a graph indicating an operation corresponding to each of the layers of the neural network and a plurality of corresponding operation devices performing the operation.

FIG. 2A illustrates an example of a distribution strategy. In an example of FIG. 2A, a neural network may include layer 1 and layer 2. The distribution strategy may include a plurality of parallel processing methods. By the parallel processing methods, an operation of each layer may be performed.

A parallel processing method may include a combination of a division method of dividing the layers, and a plurality of operation devices performing a corresponding operation.

The processor 200 may obtain a distribution strategy combination based on a plurality of operation devices as follows. For example, when a current input is present in one operation device and a total of n operation devices are used, the processor 200 may not distribute the input, or generate a distribution strategy combination that performs an operation using remaining n−1 operation devices excluding the operation device in which the current input is present.

When distributing the operation into the operation devices, the processor 200 may distribute the operation by dividing the input by at least one of a channel direction, a height direction, and/or a width direction.

Figure 2B:
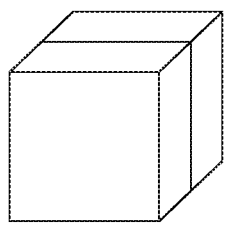
FIG. 2B illustrates an example of dividing an input by a distributed processing apparatus of a neural network model.
Figure 2B:
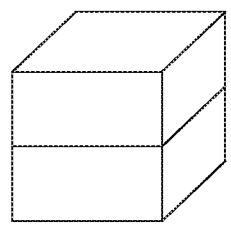
Figure 2B:
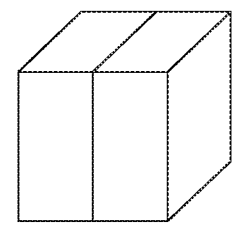
Figure 3:
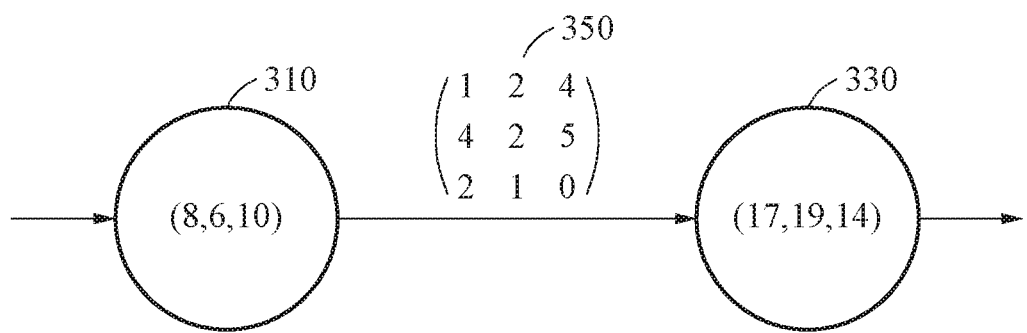
FIG. 3 illustrates an example of a portion of a graph generated by a distributed processing apparatus of a neural network model.

FIG. 2B illustrates an example of respectively dividing an input by a channel direction, a height direction, and a width direction.

When there are the n operation devices, the number of combinations of distribution strategies may be represented by Equation 1 below, for example.

$$\binom{n}{1} + 3*\left(\binom{n}{2} + \ldots + \binom{N}{n}\right) = \sum_{k=2}^{n}\binom{n}{k}*3 + n \quad \text{Equation 1}$$

For example, when using three operation devices, the number of methods of selecting three operation devices, to be used to perform the operation, from among the three operation devices may be $$\binom{3}{3}$$

and the number of division methods of dividing layers may be three (including channel-based division method, height-based division method, and width-based division method). Thus, the processor 200 may calculate the number of combinations of distribution strategies using the three operation devices by multiplying $$\binom{3}{3}$$

and 3. Thus, as $$\binom{3}{3} \times 3 = 3,$$

the processor 200 may determine that there are three combinations of distribution strategies when all three operation devices are to be used and there are three division methods of dividing the input.

In this example, the number of methods of selecting two operation devices from among the three operation devices may be $$\binom{3}{2}$$

and the number of division methods of dividing layers may be three, and the processor 200 may calculate the number of combinations of distribution strategies using the two operation devices by multiplying $$\binom{3}{2}$$

and 3. Thus, as $$\binom{3}{2} \times 3 = 9,$$

the processor 200 may determine that there are nine combinations of distribution strategies when two of the three operation devices are to be used and there are three division methods of dividing the input.

In this example, when using one operation device among the three operation devices, distribution of the operation among the operations devices may not be performed, and thus the number of cases may correspond to the number of operation devices. The processor 200 may obtain the total number of all distribution strategies and each of the distribution strategies by adding all the numbers of cases described above.

The processor 200 may calculate the number of combinations of distribution strategies, and calculate a switching time between the distribution strategies. The processor 200 may generate an adjacency matrix with the switching time based on a data conversion time and a network movement time.

The processor 200 may calculate all operation times and switching times that may occur when performing an operation by using an applicable distribution strategy for each layer offline to find an optimal cost for the neural network, and obtain them in the form of a vector and/or matrix (for example, an adjacency matrix).

The processor 200 may determine an optimal distribution strategy that may be implemented by the neural network at a minimum cost by solving a partitioned Boolean quadratic problem (PBQP) using the obtained adjacency matrix.

The PBQP may be defined as represented by Equations 2 through 4 below, for example.

$$\min \sum_{i=1}^{n} \sum_{j=1}^{n} \vec{x}_i^T C_{ij} \vec{x}_j + \sum_{i=1}^{n} \vec{x}_i^T \vec{m}_i \qquad \text{Equation 2}$$

$$\vec{x}_i^T \mathbf{1} = \vec{1} \quad \forall i = 1 \ldots n \qquad \text{Equation 3}$$

$$\vec{x}_i \in \{0, 1\}^{d_i} \quad \forall i = 1 \ldots n \qquad \text{Equation 4}$$

In Equations 2 through 4 above, $\vec{x}_i$ denotes a one-hot vector, $C_{ij}$ denotes an adjacency matrix connecting an i node and a j node, and $\vec{m}_i$ denotes a cost entry of the i node.

In an example of FIG. 2A, when an operation of layer 1 is performed by a parallel processing method A (a first parallel processing method), an operation time may be 8 microseconds (µs). When the operation of layer 1 is performed by a parallel processing method B (a second parallel processing method), an operation time may be 6 µs. When the operation of layer 1 is performed by a parallel processing method C (a third parallel processing method), an operation time may be 10 µs.

In an example of FIG. 2A, when an operation of layer 2 is performed by parallel processing methods A, B, and C, operations times may be 17 µs, 19 µs, and 14 µs, respectively.

The processor 200 may indicate the switching time by an adjacency matrix illustrated in an upper left portion of FIG. 2A, for example. Here, a switching time needed for each parallel processing method to be performed when an operation is performed from layer 1 to layer 2 may be indicated by a matrix as illustrated.

For example, when the operation is performed by from the parallel processing method A of layer 1 to the parallel processing method A of layer 2, a switching time may be 1 µs and the processor 200 may determine a (1, 1) component of the adjacency matrix to be 1.

Similarly, the processor 200 may obtain switching times for remaining cases and generate the adjacency matrix.

The processor 200 may generate a graph as illustrated in FIG. 3 from an operation of a neural network according to a distribution strategy.

The processor 200 may generate a node including a vector having an operation time as a component. In the example of FIG. 2A, the processor 200 may generate a node including a vector using an operation time of layer 1. Referring to FIG. 3, a vector of a node 310 corresponding to layer 1 may be indicated as (8, 6, 10), and a vector of a node 330 corresponding to layer 2 may be indicated as (17, 19, 14).

In addition, the processor 200 may generate an edge by generating an adjacency matrix having a switching time as a component. For example, an edge connecting the nodes 310 and 330 may be indicated using an adjacency matrix 350.

Figure 4:
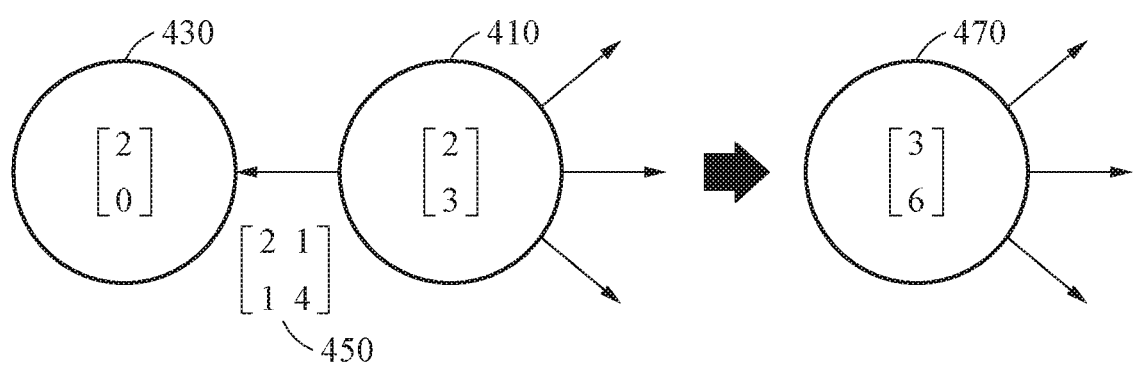
FIG. 4 illustrates an example of performing a reduction operation on a graph by a distributed processing apparatus of a neural network model.

FIG. 4 illustrates an example of performing a reduction operation on a graph by a distributed processing apparatus of a neural network model (e.g., the distributed processing apparatus of the neural network model illustrated in FIG. 1).

Referring to FIG. 4, the processor 200 may perform a reduction operation on a generated graph. The processor 200 may perform the reduction operation using a PBQB solving method.

In the example of FIG. 4, an operation time of a first parallel processing method may be 2 µs and an operation time of a second parallel processing method may be 3 µs in a first layer, and an operation time of the first parallel processing method may be 2 µs and an operation time of the second parallel processing method may be 0 µs in a second layer.

The processor 200 may generate a first node 410 corresponding to the first layer based on a vector (2, 3) generated based on the operation times corresponding to the first layer, and a second node 430 corresponding to the second layer based on a vector (2, 0) generated based on the operation times corresponding to the second layer.

The processor 200 may generate an adjacency matrix 450 based on a switching time from the first layer to the second layer. For example, according to the adjacent matrix 450, a switching time from the first parallel processing method of the first layer to the first parallel processing method of the second layer may be 2 µs, a switching time from the first parallel processing method of the first layer to the second parallel processing method of the second layer may be 1 µs, a switching time from the second parallel processing method of the first layer to the first parallel processing method of the second layer may be 1 µs, and a switching time from the second parallel processing method of the first layer to the second parallel processing method of the second layer may be 4 µs.

The processor 200 may calculate a second operation cost needed for an operation from the first node 410 to the second node 430 based on the vectors and the adjacency matrix 450. The second operation cost may have a plurality of values based on a node and a dimension (or size) of an adjacency matrix.

The processor 200 may merge the first node 410 and the second node 430 based on the second operation cost. The processor 200 may calculate a sum of a component of the vector corresponding to the first node 410, a component of the vector corresponding to the second node 430, and a component of the adjacency matrix 450, based on a distribution strategy.

In an example of FIG. 4, when the distribution strategy includes performing the operation by the first parallel processing method in the first layer and performing the operation by the first parallel processing method in the second layer, the second operation cost may be a sum of an operation time of the first parallel processing method in the first layer (2 μs), a switching time from the first parallel processing method in the first layer to the first parallel processing method in the second layer (2 μs), and an operation time of the first parallel processing method in the second layer (2 μs). Accordingly, the second operation cost may be 6 μs (=2+2+2).

When the distribution strategy includes performing the operation by the first parallel processing method in the first layer and performing the operation by the second parallel processing method in the second layer, the second operation cost may be a sum of an operation time of the first parallel processing method in the first layer (2 μs), a switching time from the first parallel processing method in the first layer to the second parallel processing method in the second layer (1 μs), and an operation time of the second parallel processing method in the second layer (0 μs). Accordingly, the second operation cost may be 3 μs (=2+1+0).

When the distribution strategy includes performing the operation by the second parallel processing method in the first layer and performing the operation by the first parallel processing method in the second layer, the second operation cost may be a sum of an operation time of the second parallel processing method in the first layer (3 μs), a switching time from the second parallel processing method in the first layer to the first parallel processing method in the second layer (1 μs), and an operation time of the first parallel processing method in the second layer (2 μs). Accordingly, the second operation cost may be 6 μs (=3+1+2).

When the distribution strategy includes performing the operation by the second parallel processing method in the first layer and performing the operation by the second parallel processing method in the second layer, the second operation cost may be a sum of an operation time of the second parallel processing method in the first layer (3 μs), a switching time from the second parallel processing method in the first layer to the second parallel processing method in the second layer (4 μs), and an operation time of the second parallel processing method in the second layer (0 μs). Accordingly, the second operation cost may be 7 μs (=3+4+0).

The processor 200 may merge the first node 410 and the second node 430 such that the second operation cost is minimized. When the first node 410 performs the first parallel processing method, the processor 200 may determine, to be the distribution strategy, the distribution strategy corresponding to a minimum second operation cost, which is 3 μs, between the second operation costs 6 μs and 3 μs. For example, when the processor 200 determines that the first node 410 is to perform the first parallel processing method, the processor 200 may determine that the second node 430 is to perform the second parallel processing method, in response to the second operation cost of such distribution strategy (3 μs) being less than the second operation cost of the distribution strategy when both the first node 410 and the second node 430 perform the first parallel processing method (6 μs).

As described above, the distribution strategy corresponding to the 3 μs second operation cost may be a strategy by which the first parallel processing method is performed in the first layer and the second parallel processing method is performed in the second layer.

When the first node 410 performs the second parallel processing method, the processor 200 may determine, to be the distribution strategy, the distribution strategy corresponding to a minimum operation cost, which is 6 μs, between the second operation costs 6 μs and 7 μs. For example, when the processor 200 determines that the first node 410 is to perform the second parallel processing method, the processor 200 may determine that the second node 430 is to perform the first parallel processing method, in response to the second operation cost of such distribution strategy (6 μs) being less than the second operation cost of the distribution strategy when both the first node 410 and the second node 430 perform the second parallel processing method (7 μs).

As described above, the distribution strategy corresponding to the 6 μs second operation cost may be a strategy by which the second parallel processing method is performed in the first layer and the first parallel processing method is performed in the second layer.

The processor 200 may generate a third node 470 by merging the first node 410 and the second node 430 to use the distribution strategy described above. The third node 470 may be generated such that the second operation cost is minimized, and thus have an operation time corresponding to (3, 6). For example, the processor 200 may generate the third node 470 corresponding to both the first layer and the second layer, such that a first parallel processing method of the third node 470 corresponds to the distribution strategy of performing the first parallel processing method in the first layer and the second parallel processing method in the second layer, and a second parallel processing method of the third node 470 corresponds to the distribution strategy of performing the second parallel processing method in the first layer and the first parallel processing method in the second layer.

The processor 200 may store the determined distribution strategy in the memory 300.

Figure 5A:
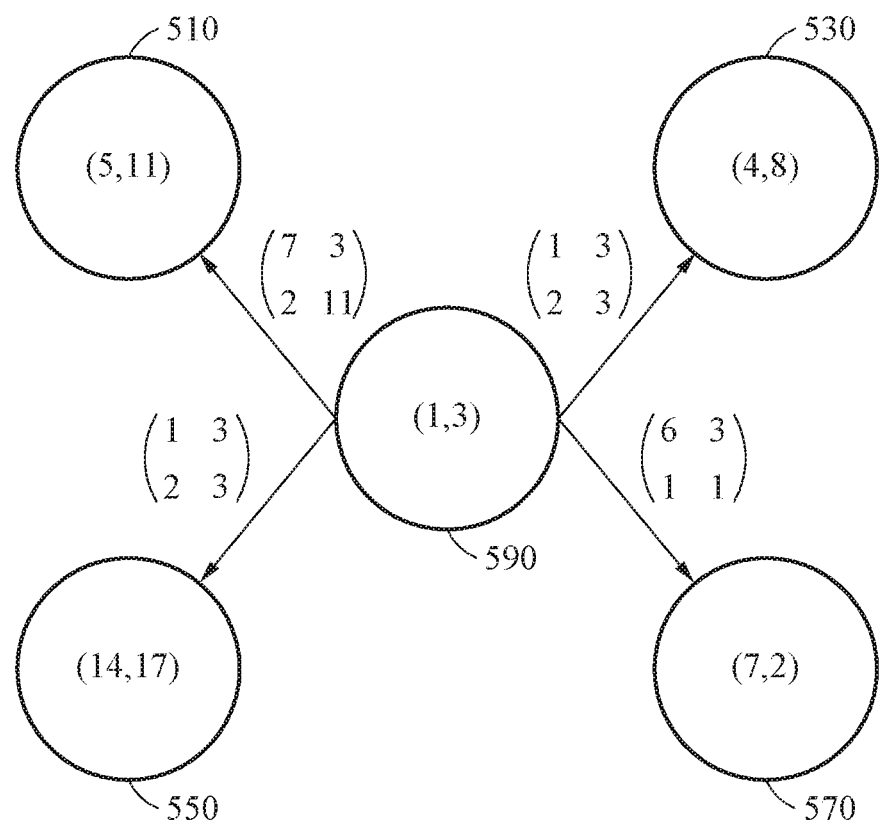
FIG. 5A illustrates an example of a graph before reduction is performed when a degree is greater than or equal to 3.
Figure 5B:
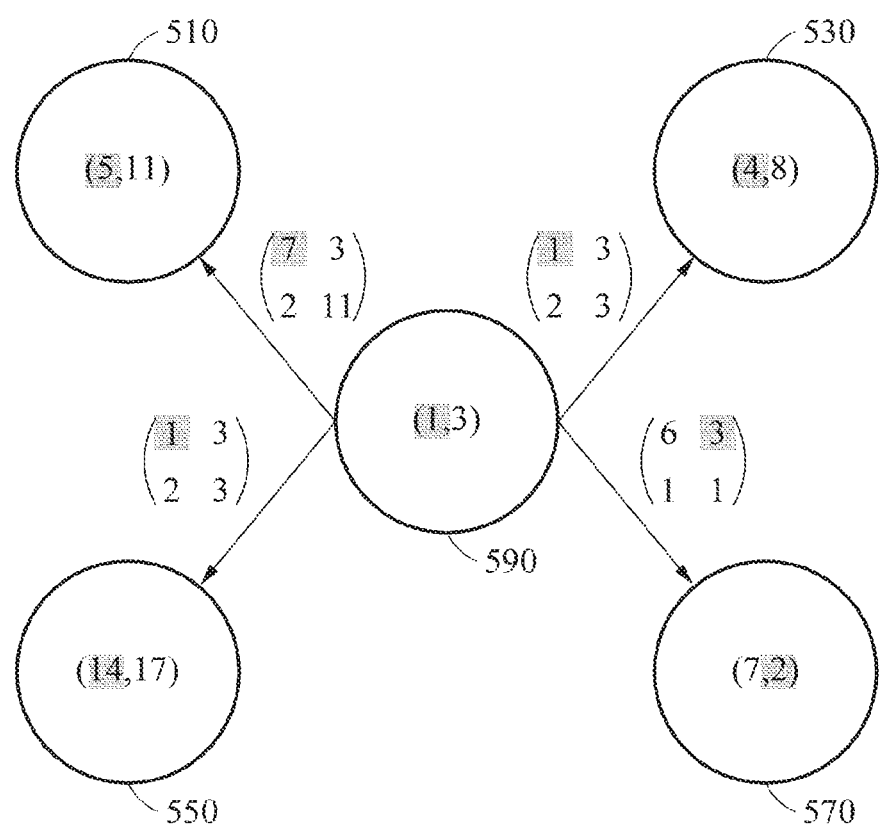
FIG. 5B illustrates an example of calculating a cost for a first dimension when a degree is greater than or equal to 3.

FIG. 5A illustrates an example of a graph before reduction is performed when a degree is greater than or equal to 3. FIG. 5B illustrates an example of calculating a cost for a first dimension when a degree is greater than or equal to 3.

Figure 5C:
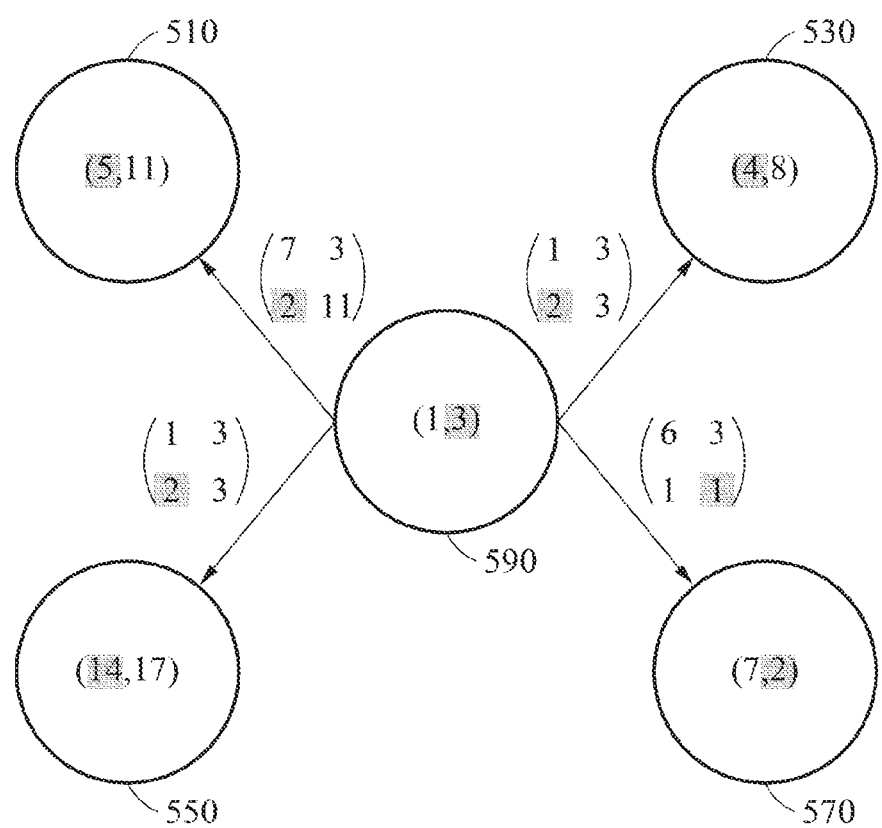
FIG. 5C illustrates an example of calculating a cost for a second dimension when a degree is greater than or equal to 3.
Figure 5D:
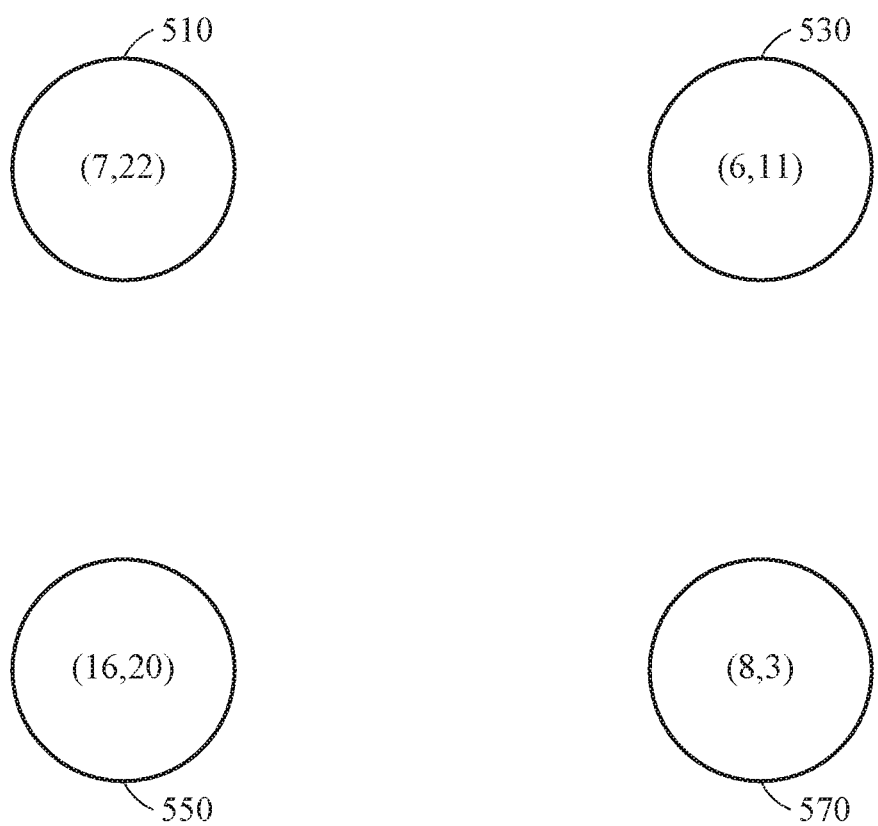
FIG. 5D illustrates an example of a graph after reduction is performed when a degree is greater than or equal to 3.

FIG. 5C illustrates an example of calculating a cost for a second dimension when a degree is greater than or equal to 3. FIG. 5D illustrates an example of a graph after reduction is performed when a degree is greater than or equal to 3.

Herein, a degree may indicate the number of edges connected to a node.

Referring to FIGS. 5A through 5D, the processor 200 may perform a reduction operation on a graph. The processor 200 may perform reduction differently based on a degree of a node. For example, the processor 200 may perform the reduction differently on a node with a degree greater than or equal to 3 than on a node with a degree less than 3.

The reduction may be performed for each degree in a same way.

For example, the reduction when the degree is 0 may be referred to as R0 reduction, the reduction when the degree is 1 may be referred to as R1 reduction, and the reduction when the degree is 2 may be referred to as R2 reduction. R0 reduction, R1 reduction, and R2 reduction may be an optimal reduction from which a reduction result permanently satisfies a minimum cost.

For example, when the degree is less than 3, the processor 200 may perform the reduction as described above with reference to FIG. 4.

However, when the degree is greater than or equal to 3, the processor 200 may perform heuristic reduction. The reduction when the degree is greater than or equal to 3 may also be referred to as RN reduction.

The heuristic reduction may not permanently satisfy a minimum cost, but may be performed within a linear time.

FIG. 5A illustrates an example of a state of a graph before the processor 200 performs the reduction. In the example of FIG. 5A, a degree of a node 590 is 4.

For example, when the processor 200 selects 1 which is a first dimension from the vector (1,3) of the node 590, a total operation cost with consideration for operations of other nodes 510, 530, 550, and 570 may be calculated to be 38 as illustrated in FIG. 5B. In this example, the operation cost in the case of selecting the first dimension may be calculated by adding all the costs highlighted/boxed in FIG. 5B.

For example, when the processor 200 selects 3 which is a second dimension from the vector (1,3) of the node 590, a total operation cost with consideration for operations of the other nodes 510, 530, 550, and 570 may be calculated to be 35 as illustrated in FIG. 5C. In this example, the operation cost in the case of selecting the second dimension may be calculated by adding all the costs highlighted/boxed in FIG. 5C.

Based on calculation results in the cases of selecting the first dimension and the second dimension, the processor 200 may select an operation using the second dimension. For example, the processor 200 may select, from among the first dimension and the second dimension, the second dimension when the total operation cost of the second dimension (35) is less than the total operation cost of the first dimension (38). The processor 200 may perform the reduction on the node 590 such that it uses the operation using the second dimension. A graph generated as result of the reduction is illustrated in FIG. 5D. For example, for each of the nodes 510, 530, 550, and 570, in FIG. 5D, the first dimension may be a sum of the first dimension of the node in FIG. 5C and the (2,1) component of the corresponding adjacency matrix, and the second dimension may be a sum of the second dimension of the node in FIG. 5C and the (2,2) component of the corresponding adjacency matrix.

Figure 6:
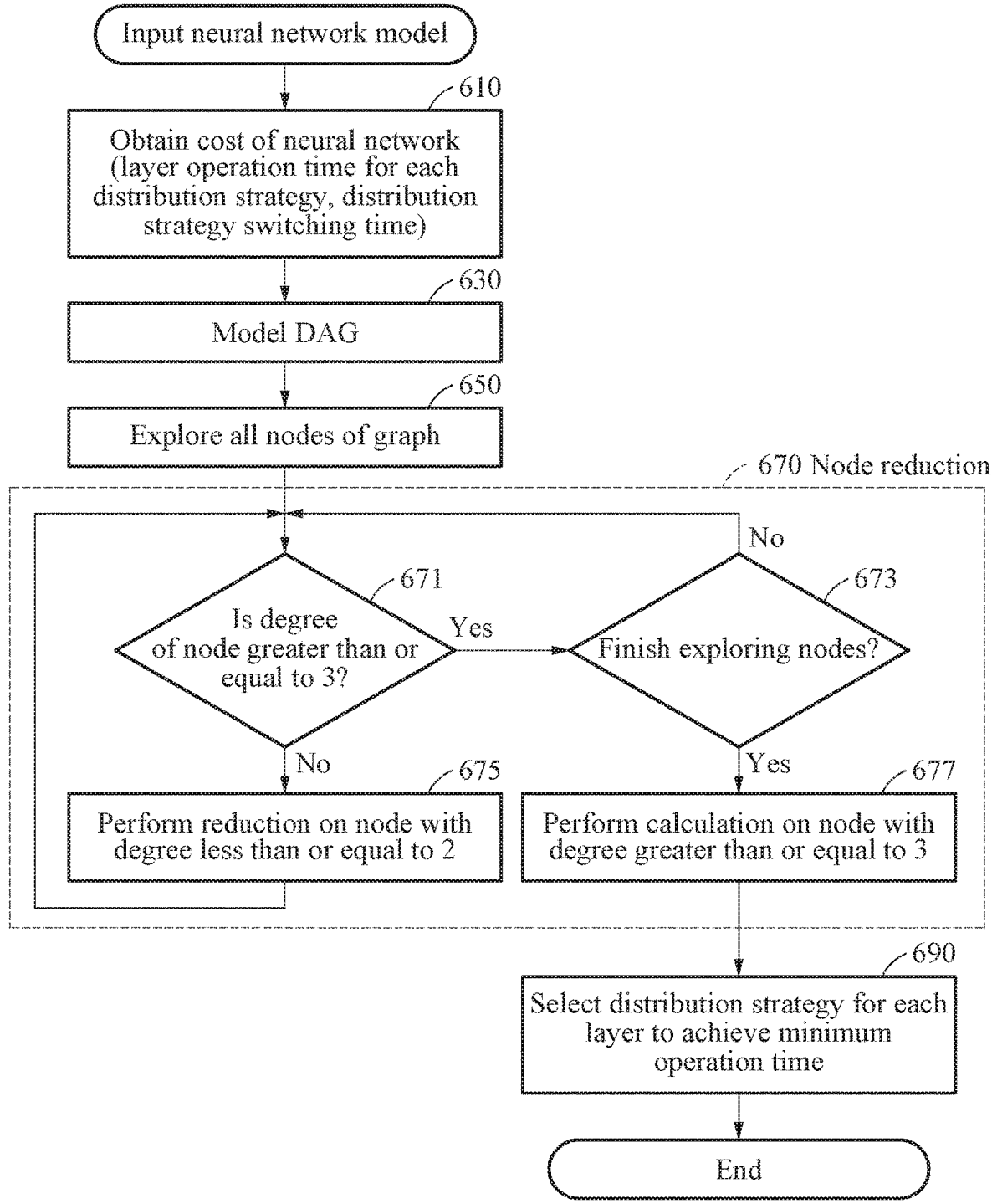
FIG. 6 is a flowchart illustrating an example of performing a reduction operation by a distributed processing apparatus of a neural network model.

FIG. 6 is a flowchart illustrating an example of performing a reduction operation by a distributed processing apparatus of a neural network model (e.g., the distributed processing apparatus of the neural network model illustrated in FIG. 1).

Referring to FIG. 6, the processor 200 may receive a neural network model as an input. The neural network model may include a DNN.

In operation 610, the processor 200 may obtain an operation cost of a neural network. The operation cost may include an operation time (or runtime) of a layer and a switching time according to a distribution strategy.

The processor 200 may obtain the operation cost of the neural network through a combination of a plurality of available operation devices and a plurality of division methods. The processor 200 may obtain an adjacency matrix indicating the number of cases of distribution strategies to be calculated and a switching time between the distribution strategies.

The processor 200 may obtain the operation cost by implementing a layer of the neural network according to various distribution strategies. The processor 200 may infer the operation time and the switching time from a record of previous measurements.

In operation 630, the processor 200 may generate a graph corresponding to the neural network based on the obtained operation cost, for example, a first operation cost. For example, the processor 200 may model a DAG using the operation cost of the neural network.

The processor 200 may configure a node corresponding to a layer of the neural network, and indicate its cost in a vector. The processor 200 may indicate an edge between nodes by an adjacency matrix.

In operation 650, the processor 200 may explore all nodes of the graph. In operation 670, the processor 200 may perform a reduction operation while exploring all the nodes. The processor 200 may perform the reduction operation as described above with reference to FIGS. 4 through 5D, as non-limiting examples.

In operation 671, the processor 200 may determine whether a degree of a node is greater than or equal to 3. The degree used herein may indicate the number of edges connected to a node.

In operation 673, when the degree of the node is greater than or equal to 3, the processor 200 may determine whether the processor 200 finishes exploring the nodes.

In operation 675, when the processor 200 does not finish exploring all the nodes and the degree of the node is less than or equal to 2, the processor 200 may perform the reduction operation.

In operation 677, when the processor 200 finishes exploring all the nodes, the processor 200 may perform a calculation on the node with the degree greater than or equal to 3. In the neural network, there may be many layer connections with the degree being less than or equal to 2, and thus a reduction operation time may be close to linear.

In operation 690, after performing the reduction operation on all the nodes, the processor 200 may select a distribution strategy for each layer to achieve a minimum operation time. The processor 200 may determine the minimum operation time as described above with reference to FIG. 4, as a non-limiting example.

The processor 200 may select an optimal distribution strategy by which the operation cost is minimized from among the various distribution strategies by performing the reduction operation on all the nodes, and perform an operation of the neural network.

Such processes of generating a graph and determining a distribution strategy including a reduction operation may be performed offline.

Figure 7:
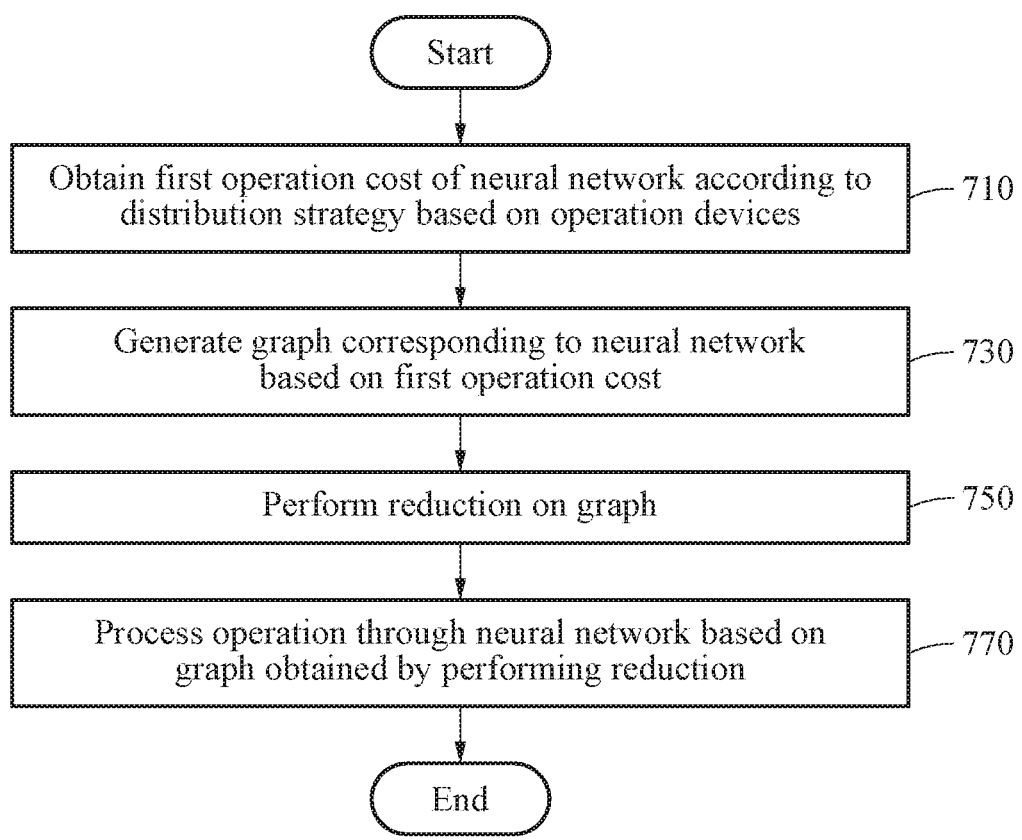
FIG. 7 is a flowchart illustrating an example of a distributed processing method performed by a distributed processing apparatus of a neural network model.

FIG. 7 is a flowchart illustrating an example of a distributed processing method performed by a distributed processing apparatus of a neural network model (e.g., the distributed processing apparatus of the neural network model illustrated in FIG. 1).

Referring to FIG. 7, in operation 710, the processor 200 may obtain a first operation cost of a neural network according to a distribution strategy based on a plurality of operation devices.

The processor 200 may obtain an operation time included in the first operation cost for a layer of the neural network according to the distribution strategy. The processor 200 may obtain a switching time included in the first operation cost according to the distribution strategy.

The distribution strategy may be determined based on the number of the operation devices and a division method of dividing an input to the neural network.

In operation 730, the processor 200 may generate a graph corresponding to the neural network based on the first operation cost. The processor 200 may generate a node based on the operation time included in the neural network. The processor 200 may generate an edge connecting nodes based on the switching time.

The processor 200 may generate the node including a vector having the operation time as a component. The processor 200 may generate the edge by generating an adjacency matrix having the switching time as a component.

In operation 750, the processor 200 may perform reduction on the graph. The processor 200 may merge a plurality of nodes based on a plurality of vectors corresponding to the nodes included in the graph and an adjacency matrix corresponding to an edge connecting the nodes.

The processor 200 may calculate a second operation cost needed for an operation from a first node to a second node included in the nodes based on the vectors and the adjacency matrix.

The processor 200 may calculate the second operation cost by calculating a sum of a component of a vector corresponding to the first node, a component of a vector corresponding to the second node, and a component of the adjacency matrix, based on the distribution strategy.

The processor 200 may merge the first node and the second node based on the second operation cost. The processor 200 may merge the first node and the second node such that the second operation cost is minimized.

In operation 770, the processor 200 may process the operation through the neural network based on a graph obtained by performing the reduction.

The distributed processing apparatuses, processors, memories, receivers, distributed processing apparatus 10, processor 200, memory 300, receiver 100, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network distributed processing method, comprising:
   obtaining a first operation cost comprising an operation time for processing an operation of a layer of a neural network, the operation time comprising a plurality of operation times each corresponding to a respective parallel processing method, and a switching time for transmitting output data of the operation of the layer to a subsequent layer of the neural network, according to a distribution strategy based on a plurality of operation devices;
   generating an operation configuration corresponding to the neural network based on the obtained first operation cost;
   performing a reduction operation on the generated operation configuration by merging a plurality of nodes of the neural network, based on the plurality of operation times; and
   processing an operation of the neural network based on a reduced operation configuration obtained by performing the reduction operation.

2. The method of claim 1, wherein the obtaining of the first operation cost comprises:
   obtaining the operation time included in the first operation cost for the layer of the neural network based on the distribution strategy; and
   obtaining the switching time included in the first operation cost according to the distribution strategy.

3. The method of claim 2, wherein the operation time includes the time for processing the operation of the neural network in the layer.

4. The method of claim 2, wherein the generating of the operation configuration comprises:
   generating a node of the neural network based on the operation time; and
   generating an edge connecting the node to one or more nodes of the neural network based on the switching time.

5. The method of claim 4, wherein the generating of the node comprises:
   generating the node based on a vector including the operation time as a component.

6. The method of claim 5, wherein
   the operation time included in the vector comprises the plurality of operation times, and
   each of the operation times is for performing the operation of the neural network in the layer based on the respective parallel processing method.

7. The method of claim 4, wherein the generating of the edge comprises:
   generating the edge by generating an adjacency matrix including the switching time as a component.

8. The method of claim 1, wherein the merging comprises:
   merging the plurality of nodes of the neural network based on a plurality of vectors corresponding to the nodes included in the operation configuration and an adjacency matrix corresponding to an edge connecting two or more of the nodes.

9. The method of claim 8, wherein the merging comprises:
   calculating, based on the vectors and the adjacency matrix, a second operation cost including an operation time of a first node of the nodes, an operation time of a second node of the nodes, and a switching time between the first node and the second node; and
   merging the first node and the second node based on the second operation cost.

10. The method of claim 9, wherein the calculating of the second operation cost comprises:
    calculating, based on the distribution strategy, a sum of a component of a vector corresponding to the operation time of the first node, a component of a vector corresponding to the operation time of the second node, and a component of the adjacency matrix corresponding to the switching time.

11. The method of claim 10, wherein the merging of the first node and the second node based on the second operation cost comprises:

merging the first node and the second node such that the second operation cost is minimized.

12. The method of claim 1, wherein the distribution strategy is determined based on the number of the operation devices and a division method of dividing an input to the neural network.

13. The method of claim 1, wherein the operation configuration comprises a directed acyclic graph (DAG) of nodes and edges of the neural network.

14. A non-transitory computer-readable storage medium storing instructions that, when executed by a processor, configure the processor to perform the method of claim 1.

15. A neural network distributed processing apparatus, comprising:
a processor configured to
obtain a first operation cost comprising an operation time for processing an operation of a layer of a neural network, the operation time comprising a plurality of operation time each corresponding to a respective parallel processing method, and a switching time for transmitting output data of the operation of the layer to a subsequent layer of the neural network, according to a distribution strategy based on a plurality of operation devices,
generate an operation configuration corresponding to the neural network based on the obtained first operation cost,
perform a reduction operation on the generated operation configuration by merging a node of the neural network and one or more other nodes, based on the plurality of operation times, and
process, using the operation devices, an operation of the neural network based on an operation configuration obtained by performing the reduction operation.

16. The apparatus of claim 15, wherein, for the obtaining of the first operation cost, the processor is configured to:
obtain the operation time included in the first operation cost for the layer of the neural network based on the distribution strategy; and
obtain the switching time included in the first operation cost according to the distribution strategy.

17. The apparatus of claim 16, wherein, for the generating of the operation configuration, the processor is configured to:
generate a node of the neural network based on the operation time; and
generate an edge connecting the node to one or more nodes of the neural network based on the switching time.

18. The apparatus of claim 17, wherein, for the generating of the node, the processor is configured to:
generate the node based on a vector including the operation time as a component.

19. The apparatus of claim 17, wherein, for the generating of the edge, the processor is configured to:
generate the edge by generating an adjacency matrix including the switching time as a component.

20. The apparatus of claim 15, wherein, for the merging, the processor is configured to:
merge the plurality of nodes of the neural network based on a plurality of vectors corresponding to the nodes included in the operation configuration and an adjacency matrix corresponding to an edge connecting two or more of the nodes.

21. The apparatus of claim 20, wherein, for the merging, the processor is configured to:
calculate, based on the vectors and the adjacency matrix, a second operation cost including an operation time of a first node of the nodes, an operation time of a second node of the nodes, and a switching time between the first node and the second node; and
merge the first node and the second node based on the second operation cost.

22. The apparatus of claim 21, wherein, for the calculating of the second operation cost, the processor is configured to:
calculate, based on the distribution strategy, a sum of a component of a vector corresponding to the operation time of the first node, a component of a vector corresponding to the operation time of the second node, and a component of the adjacency matrix corresponding to the switching time.

23. The apparatus of claim 22, wherein, for the merging of the first node and the second node, the processor is configured to:
merge the first node and the second node such that the second operation cost is minimized.

24. The apparatus of claim 15, wherein the distribution strategy is determined based on the number of the operation devices and a division method of dividing an input to the neural network.

25. The apparatus of claim 15, further comprising a memory storing instructions that, when executed by the processor, configured the processor to perform the obtaining of the first operation cost, the generating of the operation configuration, the performing of the reduction operation, and the processing of the operation included in the neural network.

* * * * *